(12) United States Patent
Yamada

(10) Patent No.: US 6,832,816 B2
(45) Date of Patent: Dec. 21, 2004

(54) METALLIC CYLINDRICAL MEMBER AND METALLIC BRACKET

(75) Inventor: Nobuo Yamada, Aichi-ken (JP)

(73) Assignee: Nihon Technica Co., Ltd., Aichi-ken (JP)

( * ) Notice: Subject to any disclaimer, the term of this patent is extended or adjusted under 35 U.S.C. 154(b) by 15 days.

(21) Appl. No.: 10/290,227

(22) Filed: Nov. 8, 2002

(65) Prior Publication Data

US 2004/0090103 A1 May 13, 2004

(51) Int. Cl.[7] ............................................. A47C 7/36
(52) U.S. Cl. .................. 297/391; 297/463.1; 297/463.2
(58) Field of Search ........................... 297/463.1, 463.2, 297/391, 452.18

(56) References Cited

U.S. PATENT DOCUMENTS

| | | | | |
|---|---|---|---|---|
| 3,948,561 A | * | 4/1976 | de Rosa | 297/391 |
| 5,816,658 A | * | 10/1998 | Wallis | 297/410 |
| 6,296,316 B1 | * | 10/2001 | Hann | 297/463.1 |
| 6,454,356 B1 | | 9/2002 | Yamada | |
| 6,641,219 B2 | * | 11/2003 | Meshke et al. | 297/391 X |

FOREIGN PATENT DOCUMENTS

JP    2002-79333 A    3/2002

* cited by examiner

Primary Examiner—Anthony D. Barfield
(74) Attorney, Agent, or Firm—Sughrue Mion, PLLC

(57) ABSTRACT

Disclosed is a metallic cylindrical member and a metallic bracket that can prevent a change in inside diameter of the metallic cylindrical member which is induced with an external force applied on cooling of the welded portion. When forming the bracket by engaging projections and recesses with each other, which projections and recesses are formed at left and right sides A, B of a metallic plate, portions P through S which span adjacent projections are crushed stripewise in the wall thickness direction to form indentations, thereby supplying metal which is forced out of the indentations P through S to around each of the projections to enhance the adhesion between adjacent projections and realize a strong joining of both left and right sides of the metallic plate.

10 Claims, 9 Drawing Sheets

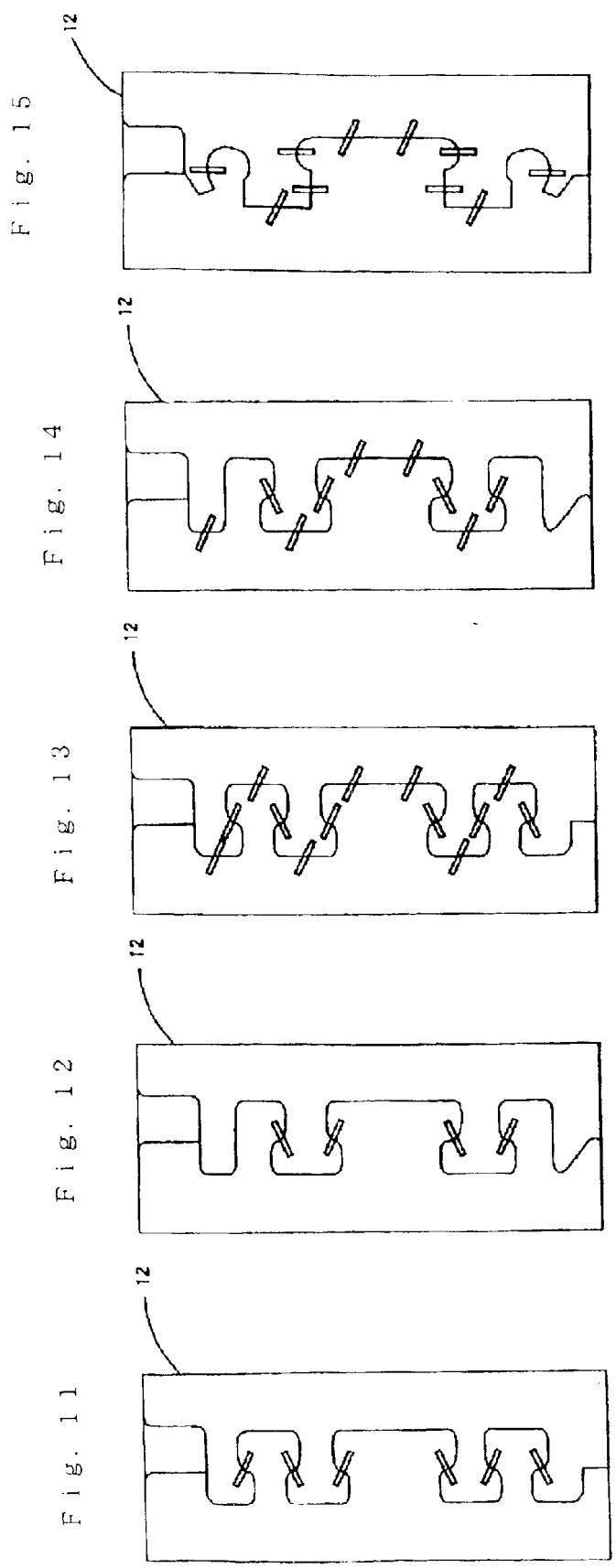

METALLIC CYLINDRICAL MEMBER AND METALLIC BRACKET

BACKGROUND OF THE INVENTION

1. Field of the Invention

The present invention relates to a metallic cylindrical member and a metallic bracket. Particularly, the invention is concerned with a metallic cylindrical member and a metallic bracket, which are formed by joining a pair of sides of a metallic plate.

2. Description of the Prior Art

According to the prior art, as shown in FIG. 37, a generally square pipe-shaped metallic frame 1a with an axis oriented in a nearly horizontal direction is disposed at an upper position in the interior of a seat back 1 of a first seat mounted on an automobile, and generally square pipe-shaped metallic brackets 1b and 1c having axes oriented nearly vertically are attached to the metallic frame 1a.

Generally cylindrical headrest supports 3 and 4 are inserted into the metallic brackets 1b and 1c, the headrest supports 3 and 4 supporting headrest stays 2a and 2b which are projected substantially in a vertically downward direction from the headrest 2.

As shown in FIG. 38, the metallic brackets 1b and 1c are each formed in the shape of a square pipe by bending a metallic plate so that left and right sides of the metallic plate are opposed to each other and by subsequently joining the opposed sides. The portions to be joined of the metallic brackets 1b and 1c are designed to take spring-back into account and therefore a clearance of a predetermined width is formed between both sides of the metallic plate.

The joined portions are brought into a substantially closely contacted state with one flat wall surface of the metallic frame 1a and in this state welding is applied to between the bent portions of the metallic brackets 1b, 1c and the wall surface of the metallic frame 1a abutted against the bent portions, whereby the metallic brackets 1b and 1c are fixed to the metallic frame 1a.

In the above conventional metallic cylindrical member, since the metallic brackets 1b and 1c are welded to the metallic frame 1a, welded portions 5 shown in FIG. 38 shrink on cooling. With this shrinkage of the welded portions 5, the bent portions of the metallic brackets 1b and 1c abutted against the metallic frame 1a are pulled away from each other. Consequently, the sides of the metallic brackets 1b and 1c move away from each other, resulting in a wider width than the foregoing predetermined width. Thus, there has been a problem that an inside diameter of the metallic cylindrical member is changed by welding despite the inside diameter being designed to a value which permits the headrest supports to be supported without clearance in a state before welding.

SUMMARY OF THE INVENTION

Accordingly, the present invention aims to solve said problems and to provide a metallic cylindrical member and a metallic bracket both able to suppress a change in inside diameter which is caused by an external force applied on cooling of a welded portion.

In one aspect, the invention is constructed such that concave and convex shapes adapted to engage each other in an anti-dislodgment manner are formed at a pair of sides of a metallic plate, then both sides are confronted with each other and the concave and convex shapes are put in engagement with each other to join both sides.

In this construction, when a pair of sides of a metallic plate are opposed to each other and concave and convex shapes formed at both sides are engaged with each other to join both sides, both sides are engaged with each other in an anti-dislodgment manner and are thereby joined strongly.

According to this construction, when the metallic cylindrical member thus formed is welded to another metallic member, even if the welded portion shrinks on cooling and an external force is applied in a direction in which are joined sides are pulled apart from each other or in a direction in which the joined sides are abutted against each other, displacement of both sides joined strongly is prevented and hence a change in inside diameter of the metallic cylindrical member is prevented.

Thus, it is possible to provide a metallic cylindrical member able to prevent a change in its inside diameter which is caused by an external force applied on cooling of the welded portion.

In another aspect, the invention is constructed such that the concave and convex shapes formed on both sides of the metallic plate may by formed so as to have approximately equal shortest distances in the seam direction.

More specifically, the concave and convex shapes are formed so that a shortest distance in the seam direction of a concave or convex shape formed on one side is approximately equal to a shortest distance in the seam direction of a concave or convex shape formed on the other side.

That is, when plural projections are formed on each side and opposed projections are engaged with each other, the sum of shortest distances in the seam direction of the projections formed on one side and the sum of shortest distances in the seam direction of the projections formed on the other side become almost equal to each other. This enables to enhance the strength of the joined portion.

Note that where such projections as mentioned above are formed, the "shortest distance" on each side indicates the sum of minimum widths of the projections in the seam direction. If the projections are constricted at their base portions, the shortest distance in question indicates the sum of widths of the base portions in the seam direction.

The concave and convex shapes may be formed so that the shortest distance throughout the whole of one side and the shortest distance throughout the whole of the other side are almost equal to each other. Alternatively, the concave and convex shapes may be formed so that the shortest distance in part of one side and the shortest distance in part of the other side are almost equal to each other.

In another aspect, the invention is constructed such that as an example of a method for joining both sides together, both sides may be crushed in the thickness direction at portions including mutually opposed concave and convex shapes in an engaged state of the concave and convex shapes formed on both sides.

According to this construction, when the concave and convex shapes formed on both sides are engaged with each other, both sides are crushed in the thickness direction at portions including mutually opposed concave and convex shapes and are joined together.

As a result, metal is shifted from the crushed portion toward the concave/convex boundary, whereby the adhesion at the boundary is enhanced and so is the strength of the joined portion.

In another aspect, the invention is constructed such that as an example of the crushing, both sides may be crushed stripewise into indentations at portions including the concave and convex shapes.

In this case, when stripe-shaped indentations are formed by crushing so as to include the concave and convex shapes, metal is dispersed from the indentations toward the concave/convex boundary. This enables to easily enhance the strength of the joined portion.

In another aspect, the invention is constructed such that as an example of forming such indentations, the indentations may be formed by crushing both sides stripewise at portions including the concave and convex portions while allowing the stripes to escape obliquely relative to the concave/convex boundary.

According to this construction wherein indentations are formed stripewise obliquely relative to the boundary, metal is dispersed widely in the seam direction. Thus, this method is useful for dispersing metal widely around the boundary and thereby realizing a strong joint of both sides.

Thus forming indentations while allowing escape obliquely relative to the concave/convex boundary is advantageous in that metal can be dispersed widely in the seam direction. But from the standpoint that it suffices for the indentations to be formed by crushing both sides stripewise at portions including the concave and convex shapes, they also may be formed in a direction nearly perpendicular to the concave-convex boundary. This permits the joining strength to be enhanced over a wide range in the seam direction.

A mere formation of indentations is useful in that the strength of the joined portion can be enhanced easily, but such a construction is merely one example.

In another aspect, the invention is constructed such that as an example of the crushing, both sides may be crushed generally circularly to form indentations (dents) at portions including the concave and convex shapes.

In this case, generally circular dents are formed by carrying out the crushing so as to include the concave and convex portions, whereby metal is dispersed from the indentations toward the concave/convex boundary. According to this construction, since metal is dispersed from a relatively wide area, that is, since much metal is fed to the boundary, it is possible to realize a stronger joining. This construction is useful in this point. This enables to feed a larger amount of metal to the concave/convex boundary and enhance the strength of the boundary.

In another aspect, the invention is constructed such that as an example of the crushing, both sides may be crushed bandwise to form indentations at portions including the concave and convex portions in such a manner as to provide a larger width on the side spaced apart from the concave/convex boundary.

According to this construction, band-like dents are formed by crushing both sides at portions including the concave and convex portions. As a result, metal is dispersed from the dents toward the convex/concave boundary. In this case, since the dents are formed so as to be wider on the side spaced apart from the boundary, metal can be dispersed to the boundary from portions spaced apart from the boundary. Consequently, it is possible to supply a sufficient amount of metal to the boundary while diminishing a thin-walled area adjacent to the boundary. In this point this construction is useful.

In another aspect, the invention is constructed such that as an example of the crushing, both sides are crushed bandwise to form indentations at portions including the concave and convex portions in such a manner that narrow and wide portions are formed alternately in directions away from the concave/convex boundary with the boundary portion formed wide.

According to this construction, when band-like dents are formed by crushing both sides at portions including the concave and convex portions, metal is dispersed from the dents toward the concave/convex boundary.

At this time, since the dents are wide at the boundary, the joining strength is enhanced over a wide area in the seam direction. Besides, since narrow and wide portions are alternate in directions away from the boundary, a larger amount of metal can be collected efficiently toward the boundary from the side away from the joined portion. This construction is useful in this point. This enables to feed a larger amount of metal to the concave/convex boundary from the portion spaced apart from the boundary while maintaining the strength of the portion adjacent to the boundary and thereby realize a strong joint.

In another aspect, the invention is constructed such that as a concrete application example of the metallic cylindrical member, plural projections adapted to engage each other in an anti-dislodgment manner are formed on a pair of sides of a metallic plate so that shortest distances in a seam direction of the projections on both sides are almost equal to each other. While allowing a joined portion to be included in one generally flat wall surface, both sides of the metallic plate are opposed to each other and the projections are brought into engagement with each other, followed by stripewise crushing at portions including the projections to form indentations, allowing both sides to be joined together, whereby the metallic plate is formed into a generally square pipe as a metallic cylindrical member. A generally pipe-like metallic frame is disposed with its axis oriented nearly horizontally at an upper position in the interior of a seat back of a first seat which is mounted on an automobile, and bent portions of the metallic cylindrical member abutted against a generally flat wall surface of the metallic frame are welded to the said wall surface in a state in which the axis of the metallic cylindrical member is oriented in a substantially vertical direction and in which the joined portion is in substantially close contact with the wall surface of the metallic frame. Further, a generally cylindrical headrest support which supports a headrest stay projected in a nearly vertically downward direction from the headrest is inserted into the metallic cylindrical member from above nearly vertically.

Thus, the present invention is useful also as a metallic bracket which supports a headrest support in a seat back of a first seat installed in an automobile.

In this way it is possible to provide a metallic bracket which supports a headrest support in a seat back of a first seat installed in an automobile and which can prevent a change in its inside diameter caused by an external force developed on cooling of the welded portions.

In another aspect, the invention is constructed such that as a concrete application example of the metallic cylindrical member, plural projections adapted to engage each other in an anti-dislodgment manner are formed on a pair of sides of a metallic plate so that shortest distances in a seam direction of the projections on both sides are almost equal to each other. While allowing a joined portion to be included in one generally flat wall surface, both sides of the metallic plate are opposed to each other and the projections are brought into engagement with each other, followed by stripewise crushing at portions including the projections to form indentations, allowing both sides to be joined together, whereby the metallic plate is formed into a generally square pipe as a metallic cylindrical member.

A pair of pipe-like metallic frames are disposed at upper positions in the interior of a seat back of a second or third seat mounted on an automobile, the metallic frames being disposed in nearly parallel with each other at a predetermined interval while allowing their axes to be oriented in a substantially horizontal direction, and bent portions of the metallic cylindrical member abutted against generally flat wall surfaces of the metallic frames are welded to the said wall surfaces in a state in which the metallic cylindrical member spans the metallic frames while allowing the axis of the metallic cylindrical member to be oriented in a substantially vertical direction and in which the joined portion is in substantially close contact with the wall surfaces of the metallic frames. Further, a generally cylindrical headrest support which supports a headrest stay projected in a nearly vertically downward direction from the headrest is inserted into the metallic cylindrical member from above nearly vertically.

Thus, the present invention is further effective as a metallic cylindrical member which supports a headrest support in a seat back of a second or third seat installed in an automobile.

According to this construction it is possible to provide a metallic bracket which supports a headrest in a seat back of a second or third seat installed in an automobile and which can prevent a change in inside diameter caused by an external force developed on cooling of the welded portions.

Other and further objects, features and advantages of the invention will appear more fully from the following description.

BRIEF DESCRIPTION OF THE DRAWINGS

In the attached drawings:

FIG. 11 is a plan view showing a joined portion of a metallic bracket according to a modification;

FIG. 12 is a plan view showing a joined portion of a metallic bracket according to another modification;

FIG. 13 is a plan view showing a joined portion of the metallic bracket illustrated in FIG. 11 with indentations added to the joined portion;

FIG. 14 is a plan view showing a joined portion of the metallic bracket illustrated in FIG. 12 with indentations added to the joined portion;

FIG. 15 is a plan view showing a joined portion of the metallic bracket embodying the invention with indentations added;

DETAILED DESCRIPTION OF THE PREFERRED EMBODIMENTS

Embodiments of the present invention will be described hereinunder with reference to the accompanying drawings.

Figure 1:
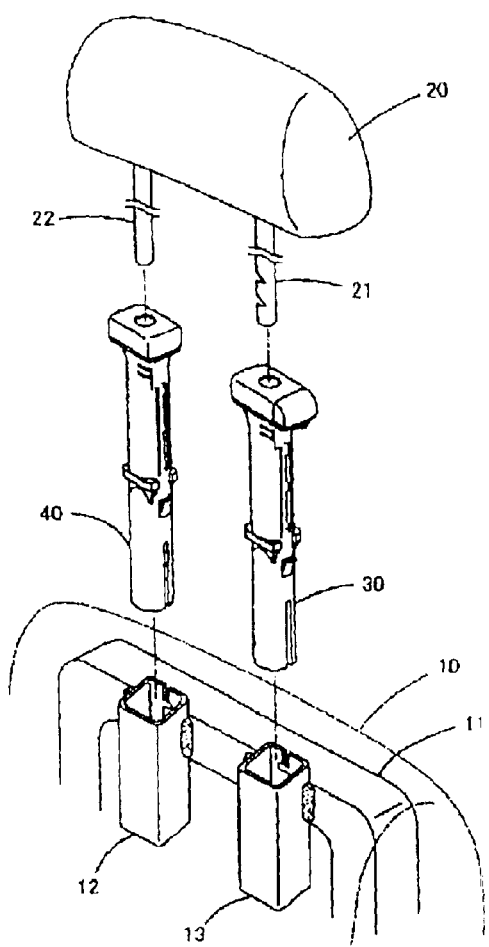
FIG. 1 is a perspective view showing a headrest support structure which utilized a metallic bracket embodying the present invention.

FIG. 1 illustrates as a perspective view a headrest support structure which utilizes metallic brackets according to an embodiment of the present invention.

As shown in the same figure, a generally square pipe-like metallic frame 11 with its axis oriented in a substantially horizontal direction is disposed at an upper position in the interior of a seat back 10 of a first seat installed in an automobile. Generally square pipe-like metallic brackets 12 and 13 with their axes oriented in a substantially vertical direction are attached to the metallic frame 11.

Generally cylindrical headrest supports 30 and 40, which support headrest stays 21 and 22 projected nearly vertically downward from a headrest 20, are inserted into the metallic brackets 12 and 13. As to the headrest supports, only the headrest support 30 will be described below, but the following description on the headrest support 30 is also true of the headrest support 40. Likewise, as to the metallic brackets, only the metallic brackets 12 will be described below, but the same description also applies to the metallic bracket 13.

Figure 3:
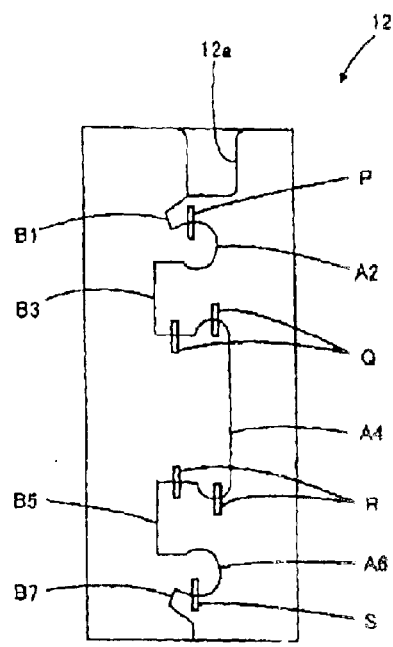
FIG. 3 is a plan view showing a joined portion after forming into a pipe shape.

The metallic bracket 12 is formed in such a generally square pipe shape as shown in FIG. 3 by folding broken-like portions of a metallic plate shown in FIG. 2 in such a manner that left and right sides A, B of the metallic plate confront each other on this side of paper and by subsequently joining both sides A and B while allowing both sides to be pressfitted together.

In this connection, the left and right sides A, B of the metallic bracket 12 are formed with such concave and convex shapes as referred to in the invention so as to be engaged with each other.

The right side A is formed rectilinearly from an upper corner in a direction nearly perpendicular to both upper and lower sides C, D and is thereafter formed with recess A1, projection A2, recess A3, projection A4, recess A5, projection A6, and recess A7 in this order.

On the other hand, the right side B is formed rectilinearly from an upper corner in a direction nearly perpendicular to the upper and lower sides C, D, then bends rightwards at nearly right angles and is formed with projection B1, recess B2, projection B3, recess B4, projection B5, recess B6, and projection B7 in this order.

The recesses are each generally narrow on the open end side thereof and wide on an inner side thereof. The projections are each generally narrow on a base side thereof and wide on a tip side. The recesses and the projections are symmetric in shape with each other, so that the projections can be allowed to get in the recesses in the thickness direction of the metallic plate. Once the projections fit in the recesses, both remain engaged with each other unless they move in the thickness direction.

In this embodiment the upper side C is formed rectilinearly. That is, the upper side C is formed so as not to become uneven when the metallic plate is folded in the shape of a quadrangular prism. Since the upper side C does not become uneven, even if a heavy load is applied to the headrest supports 30 and 40 and the headrest supports are pushed against the upper side C after inserted into the metallic brackets as will be described later, the load will be dispersed and therefore the headrest supports 30 and 40, which are made of resin, are difficult to deform. In the conventional construction, concave and convex shapes are formed in the portion corresponding to the upper side C, so that when a heavy load is applied to the headrest supports 30 and 40, the load will be concentrated on only a limited part, causing deformation.

In the above construction according to the present invention, the projections A2, A4, A6, B1, B3, B5, and B7 are brought into engagement with the opposed recesses A1, A3, A5, A7, B2, B4, and B6. In this sense, the projections constitute the concave portions in the present invention, while recesses constitute the convex portions in the present invention.

The metallic bracket 12 is crushed stripewise in the thickness direction to form indentations at a portion P which spans the projections B1 and A2, a portion Q which spans the projections B3 and A4, a portion R which spans the projections A4 and B5, and a portion S which spans the projections A6 and B7. The thus indented portions P through S are rendered integral because adjacent projections are crushed together in the thickness direction.

Since metal is dispersed from the thus indented portions P through S to the surrounding portions, the metal pushed out of the indentations P through S is fed to each adjacent portion between projections. As a result, adjacent projections are put in close contact with each other, so that it becomes possible to prevent spring-back and a strong joint can be realized.

Figure 2:
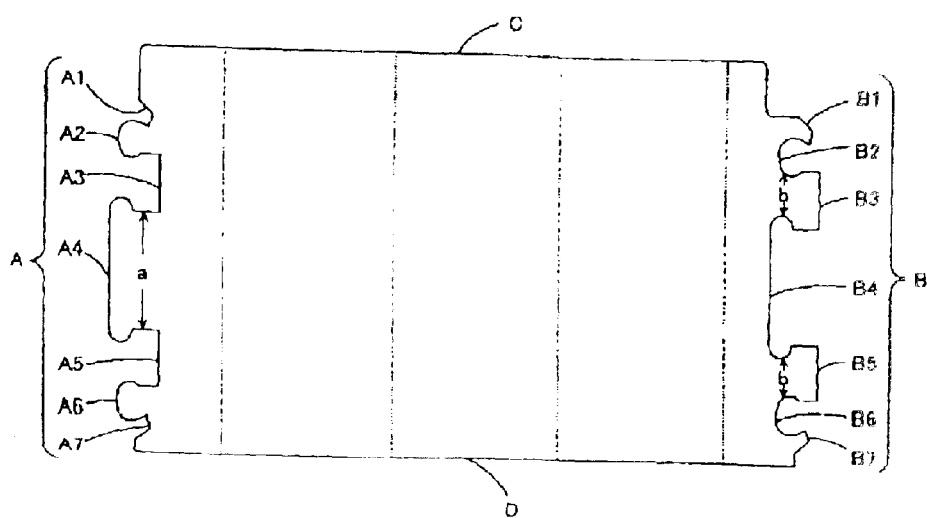
FIG. 2 is a plan view of a metallic plate prior to bending into the metallic bracket.

As shown in FIG. 2, the width, b, of a base portion of each of projections B3 and B5, which base portion is narrow in the seam direction, relative to the width, a, of a base portion of projection A4, which base portion is also narrow in the seam direction, is set at $b=\frac{1}{2}a$, whereby the engaged portion can be afforded, a sufficient strength. More specifically, it becomes possible to suppress a displacement quantity after welding to 0.05 mm and enhance the tensile strength up to 100 kg/0.1 mm.

Therefore, the width of the base portion of projection A4 on the side A is equal to the sum of the widths of the base portions of projections B3 and B5 on the side B. In this sense, the sum of base portion widths on each side indicates the shortest distance in the seam direction in the present invention.

Figure 4:
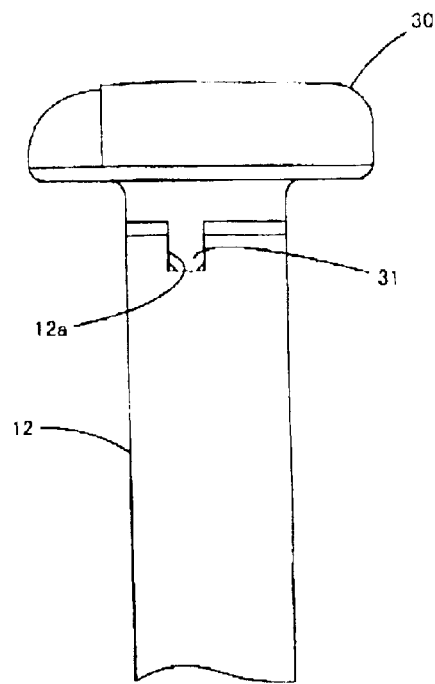
FIG. 4 is a plan view showing a state in which a projection of a headrest support has been inserted into a cutout portion formed in an upper opening of the metallic bracket.

As shown in FIG. 4, a retaining pawl 31 integral with the headrest support 30 is inserted into a cutout portion 12a formed in an upper opening of the metallic bracket 12.

Since the rotation in the circumferential direction of the retaining pawl 31 is inhibited by the cutout portion 12a, the headrest support 30 is prevented from rotating in the circumferential direction with respect to the metallic bracket 12, whereby it becomes possible to prevent wobbling of the headrest support 30.

As shown in FIG. 1, the metallic bracket 12 formed in the above manner is then welded at bent portions thereof while its joined portion is in substantially close contact with the wall surface of the metallic frame 11, whereby the metallic bracket 12 is fixed to the metallic frame 11.

Figure 5:
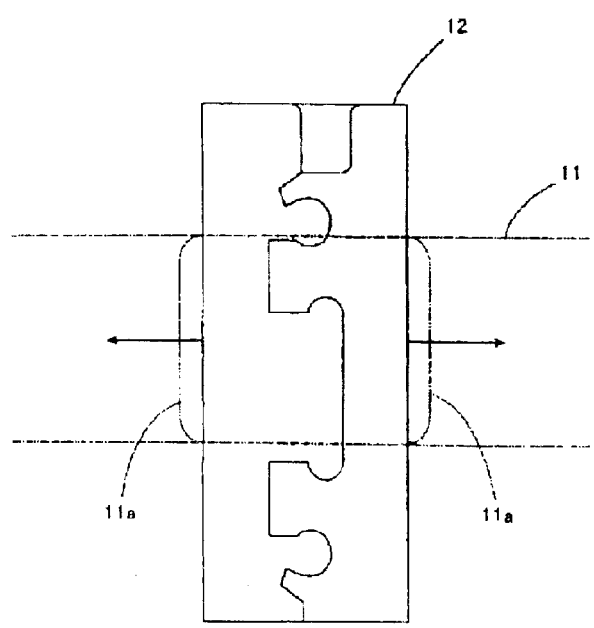
FIG. 5 is an explanatory diagram showing an external force applied to the metallic bracket when the bracket is welded to a metallic frame.

As shown in FIG. 5, the welded portions, indicated at 11a, are cooled and shrink after the welding, so that an external force is applied in the directions of arrows to the metallic bracket 12. However, since the joined portion of the metallic bracket 12 according to this embodiment is strong as noted earlier, even upon exertion of such an external force as shown in the same figure on the joined portion, the joined portion is prevented from deformation by virtue of the joining force between the mutually engaged projections and recesses.

As described earlier, the metallic bracket 12 is designed to have a predetermined inside diameter so as not to cause wobbling of the headrest support 30 when inserted into the metallic bracket from an upper opening of the bracket.

Figure 6:
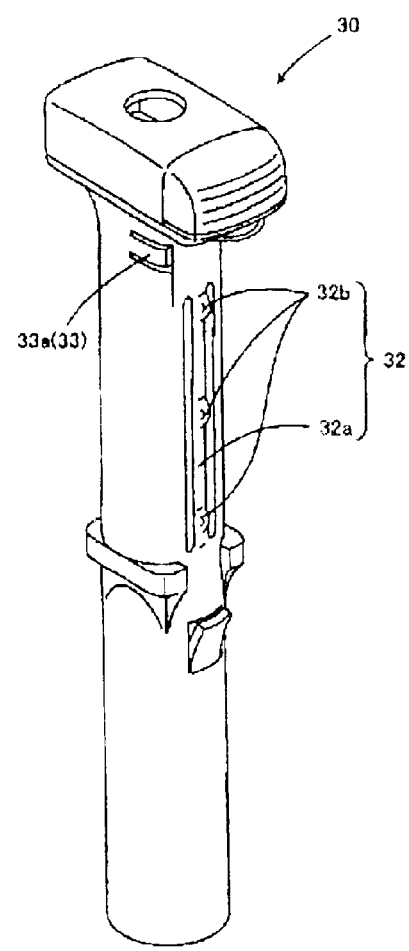
FIG. 6 is a perspective view showing an appearance of the headrest support.

To be more specific, a resin spring 32 is formed integrally on each of outer peripheral wall surfaces of the headrest support 30 which wall surfaces are oriented in the vehicular width direction, as shown in FIG. 6.

The resin spring 32 is provided with a flexible portion 32a having flexibility in a substantially radial direction, the flexible portion 32a being formed between vertical grooves which are formed substantially in parallel in the vertical direction at a predetermined interval.

The flexible portion 32a is formed with a plurality of outwardly projecting protuberances 32b.

Figure 7:
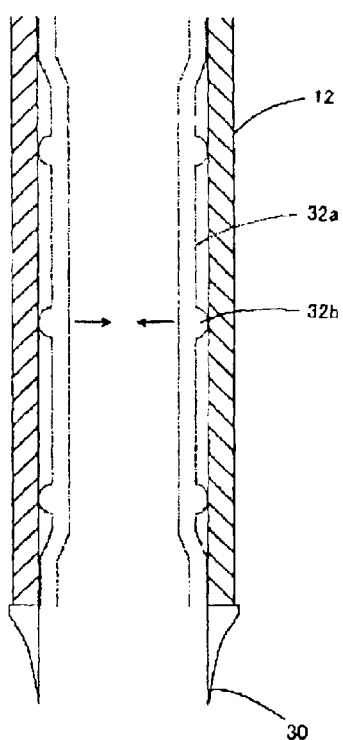
FIG. 7 is an explanatory diagram showing a resin spring in an inserted state of the resin headrest support into the metallic bracket.

According to this construction, when the headrest support 30 is inserted into the metallic bracket 12, as shown in FIG. 7, the protuberances 32b presses an inner periphery surface of the metallic bracket 12 while deflecting the flexible portion 32a inwards to prevent wobbling of the headrest support 30 in the vehicle width direction.

Further, a resin spring 33 is formed integrally on each of outer periphery wall surfaces of the headrest support 30 which wall surfaces are oriented in the vehicular longitudinal direction, as shown in the same figure.

Figure 8:
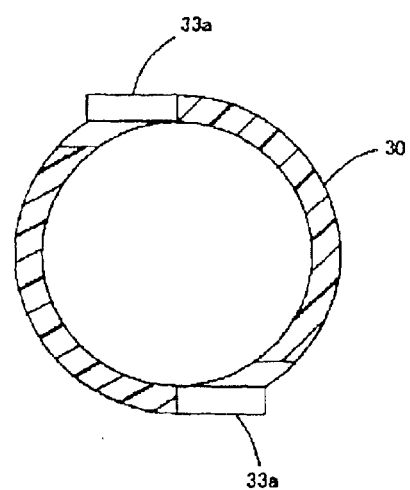
FIG. 8 is a sectional view showing the resin spring before insertion of the headrest support into the metallic bracket.
Figure 9:
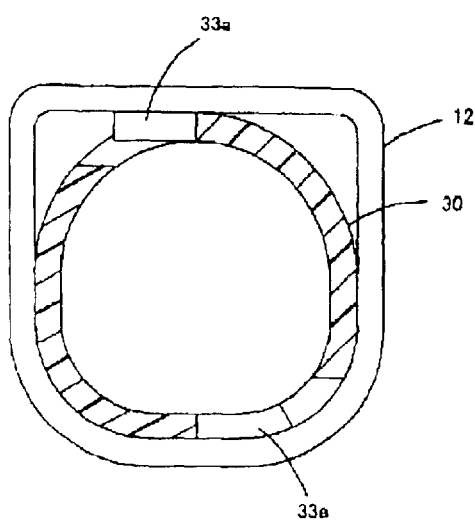
FIG. 9 is a sectional view showing the resin spring in an inserted state of the headrest support into the metallic bracket.

The resin spring 33 is constituted by a generally rectangular flexible piece 33a which is formed by a generally □-shaped cutout portion. Before insertion of the headrest support 30 into the metallic bracket 12, a free end of the resin spring 33 is slightly projected outwards, as shown in FIG. 8.

When the headrest support 30 is inserted into the metallic bracket 12, the flexible piece 33 deflects inwards by being pushed by the inner peripheral surface of the metallic bracket. At this time, the flexible piece 33a pushes the inner peripheral surface of the metallic bracket 12, trying to revert to its original shape before insertion, so that it becomes possible to prevent wobbling in the vehicular longitudinal direction of the headrest support 30.

Thus, the inside diameter of the metallic bracket 12 is required to be highly accurate for allowing the wobbling preventing structures for the headrest support 30 to function in a satisfactory manner, and this is effective in preventing the foregoing deformation.

In this case, a decrease in inside diameter of the metallic bracket 12 is also prevented, so when inserting the headrest support 30 into the metallic bracket 12, there can be attained a smooth insertion with a low load without the occurrence of an excessive load. It also becomes possible to obtain a stable load when the headrest stay 21 is inserted into the metallic bracket 12 through the headrest support 30.

Although the above description concerns the support structure for the headrest support provided in the seat back of the first seat, it is also applicable to the support structure for a headrest support provided in a seat back of a second or third seat.

Figure 10:
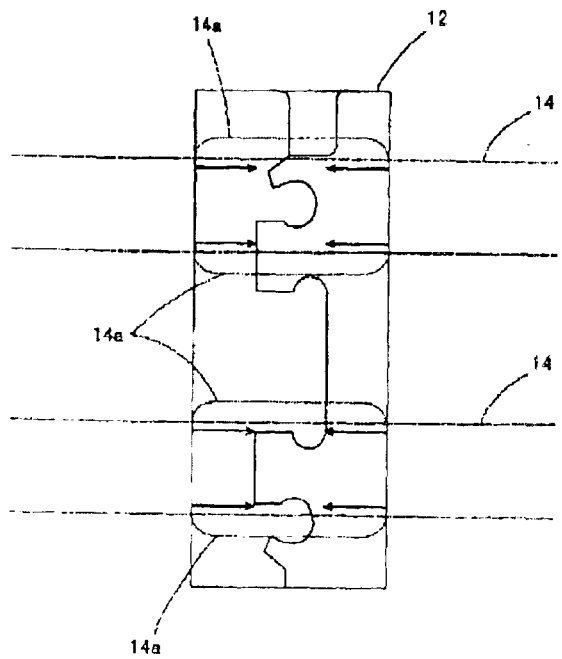
FIG. 10 is an explanatory diagram showing an external force applied to the metallic bracket when the bracket is welded to a metallic frame disposed in a seat back of a second or third seat.

In the case of the seat back in the second or third seat, as shown in FIG. 10, a pair of pipe-like metallic frames 14 with axes oriented in a substantially horizontal direction are disposed nearly in parallel at a predetermined interval, so the metallic bracket 12 is fixed by welding to the metallic frames 14 so as to span both frames.

As shown in the same figure, the welding is applied to upper and lower corner portions of the metallic frames abutted against the metallic bracket 12, including the jointed portion of the bracket. Consequently, on cooling of welded portions 14a, an external force is developed in such a manner that both right and left sides of the joined portion are pulled toward each other.

However, since the joined portion of the metallic bracket 12 according to this embodiment is strong, even under the action of such an external force as shown in the same figure, the occurrence of deformation is prevented by the joining force of both projections and recesses engaged with each other, thus making it possible to prevent a change in inside diameter of the metallic bracket 12. There accrues usefulness in this point.

The joined portion of the metallic bracket 12 according to this embodiment is a mere example and the application of such other concave and convex shapes as shown in FIGS. 11 and 12 is also possible. Also in such modifications, as in this embodiment, it is possible to prevent a change in inside diameter caused by an external force developed during welding because opposed sides of each metallic bracket are strongly engaged with each other.

In the metallic bracket 12 according to this embodiment, as shown in FIG. 3, each indentation is formed so as to span both a projection portion which is narrow in the seam direction and a projection portion which is wide in the seam direction. But this is a mere example. As shown in FIGS. 11 and 12, each indentation may be formed while allowing to escape obliquely with respect to the seam direction so as to span both projection portions which are wide in the seam direction. In this case, a high strength can be ensured as compared with the case where the indentation includes a projection portion which is narrow in the seam direction, so that it becomes possible to prevent deformation of the metallic bracket 12 more surely.

In this case, a higher strength can be ensured by adding indentations in a direction orthogonal to the seam direction, as shown in FIGS. 13 and 14. It goes without saying that, as shown in FIG. 15, like indentations may be added to the joined portion shown in FIG. 3 to enhance the strength of the joined portion.

The indentations shown in FIGS. 13 to 15 are allowed to escape obliquely with respect to the boundary of the joined portion to realize crushing over a wide area in the seam direction and thereby improve the strength of the joined portion. But indentations may be formed in a direction orthogonal to the said boundary.

Although the indentations described above are formed by stripewise crushing in the joined portion so as to include opposed concave and convex portions, crushing may be done into other shapes form the standpoint that it suffices for indentations to be formed by crushing at portions including concave and convex portions.

Figure 18:
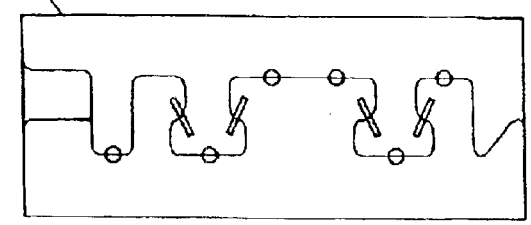
FIG. 18 is a plan view showing a joined portion of the metallic bracket illustrated in FIG. 12 with generally circular dents added.
Figure 17:
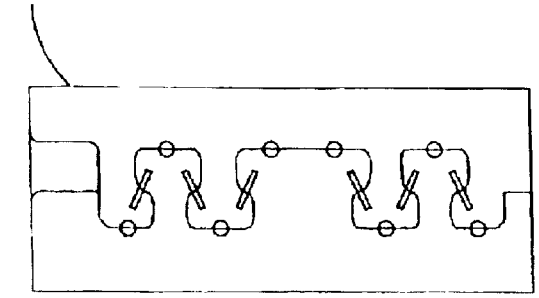
FIG. 17 is a plan view showing a joined portion of the metallic bracket illustrated in FIG. 11 with generally circular dents added.
Figure 16:
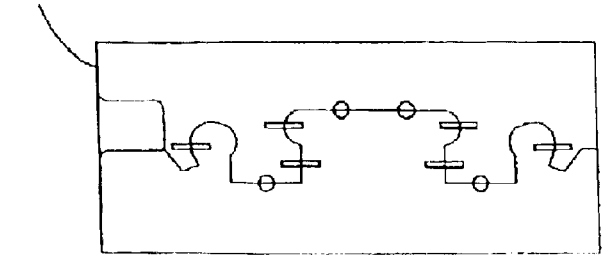
FIG. 16 is a plan view showing a joined portion of a metallic bracket embodying the invention with generally circular dents added.

For example, crushing may be done in a generally circular shape to form circular dents, as shown in FIGS. 16 to 18. Such a circular crushing is advantageous in that indentations are formed over a wide area in the seam direction and that therefore it is possible to enhance the strength of the joined portion.

Figure 20:
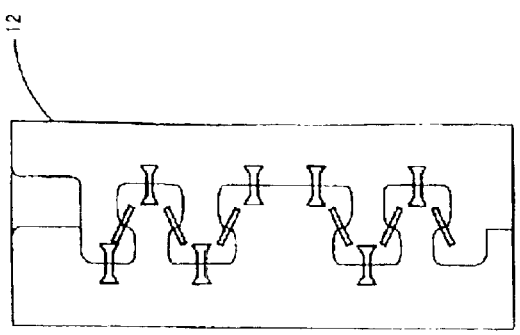
FIG. 20 is a plan view showing a joined portion of the metallic bracket illustrated in FIG. 11 with band-like dents added.
Figure 19:
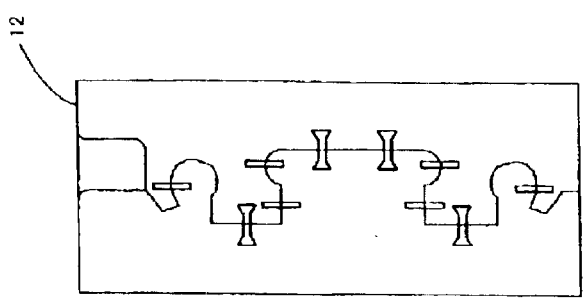
FIG. 19 is a plan view showing a joined portion of the metallic bracket embodying the invention with band-like dents added.
Figure 21:
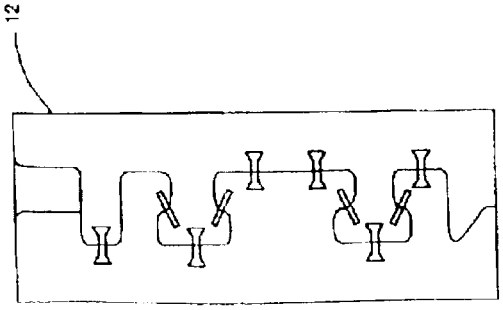
FIG. 21 is a plan view showing a joined portion of the metallic bracket illustrated in FIG. 12 with band-like dents added.

As shown in FIGS. 19 to 21, it is also possible to form dents by band-like crushing so as to provide wider dent portions on the side away from the joined portion. This is advantageous in that a larger amount of metal can be collected efficiently toward the joined portion from the side away from the joint portion and that therefore it becomes easier to let concave and convex portion adhere closely to each other in the joined portion.

Figure 24:
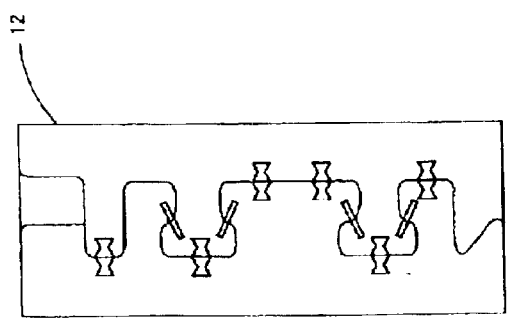
FIG. 24 is a plan view showing a joined portion of the metallic bracket illustrated in FIG. 12 with band-like dents of the different shape added.
Figure 23:
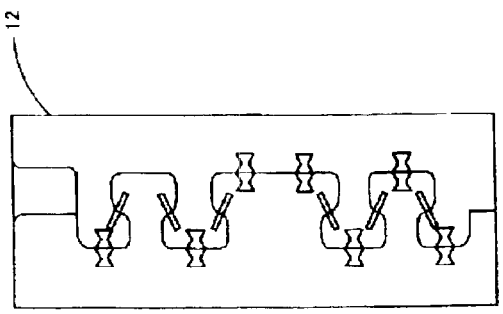
FIG. 23 is a plan view showing a joined portion of the metallic bracket illustrated in FIG. 11 with band-like dents of the different shape added.
Figure 22:
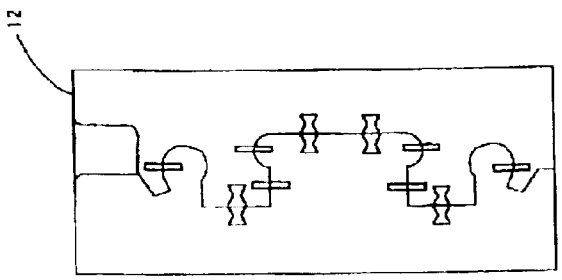
FIG. 22 is a plan view showing a joined portion of the metallic bracket embodying the invention with band-like dents of a different shape added.

As shown in FIGS. 22 to 24, it is possible to form indentations by band-like crushing in such a manner that the dents are each wide at the boundary of the joined portion and then narrow and wide portions are alternate toward the side away from the boundary. This is advantageous in that not only it is possible to form dents wide in the seam direction but also a larger amount of metal can be collected efficiently toward the joined portion from the side away from the joined portion and that therefore the strength of the joined portion can be enhanced effectively.

Although in FIGS. 16 to 24 dents of various shapes are formed in addition to the stripe indentations, this is merely an example. Other shapes that stripes may be applied to all the crushed portions.

Figure 25:
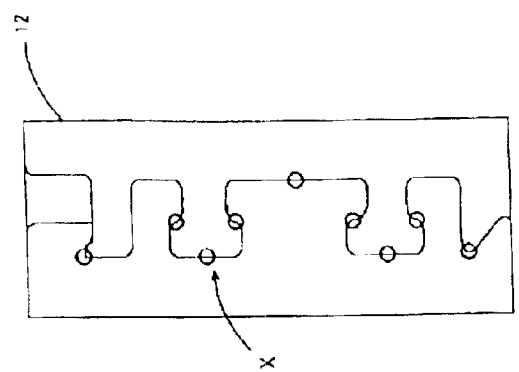
FIG. 25 is a plan view showing a joined portion using only generally circular dents.
Figure 26:
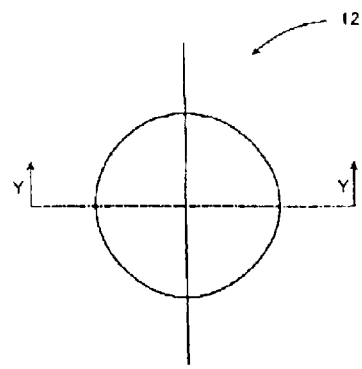
FIG. 26 is an enlarged diagram showing the construction of a portion X in FIG. 25.
Figure 27:
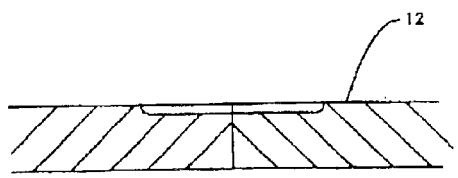
FIG. 27 is a sectional view taken on line Y—Y in FIG. 26.

For example, as shown in FIG. 25, there may be used only dents of a circular shape. As shown in FIGS. 26 and 27, dents of a generally circular shape cover a wide area in the seam direction and the amount of metal fed to the joined portion increases. Thus, this construction is useful particularly in the case where a clearance is formed in the joined portion.

Although in the above embodiment reference has been made to only the case where the metallic bracket 12 is welded to the metallic frame 11, no limitation is made to the mode of welding, but it is possible to ensure a required strength in all of such various welding modes as shown in FIGS. 28 to 35.

Figure 29:
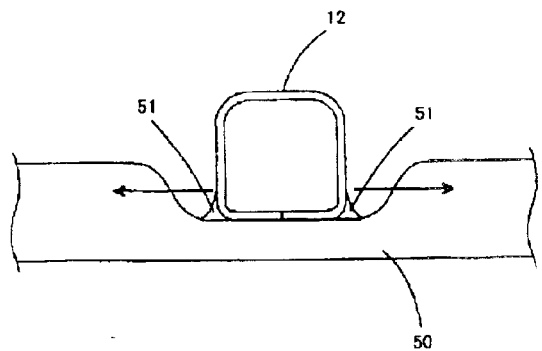
FIG. 29 is a side view showing a state after pipe type welding.
Figure 28:
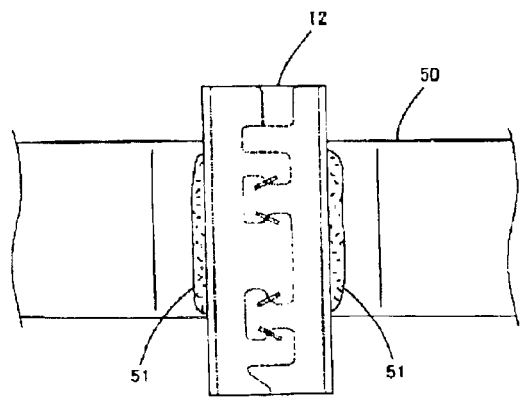
FIG. 28 is a plan view showing a state after pipe type welding.

FIG. 28 shows a case where the metallic bracket 12 is welded to a metallic pipe 50 along bent portions of the metallic bracket. In this case, as welded portions 51 are cooled, an external force is applied in disengaging directions of the engaged sides of the metallic bracket as welded portions 51 are cooled, as shown in FIG. 29. As against the pulling direction, the indentations formed by crushing as shown in the figures serve to prevent the metallic bracket 12 from extending.

Figure 30:
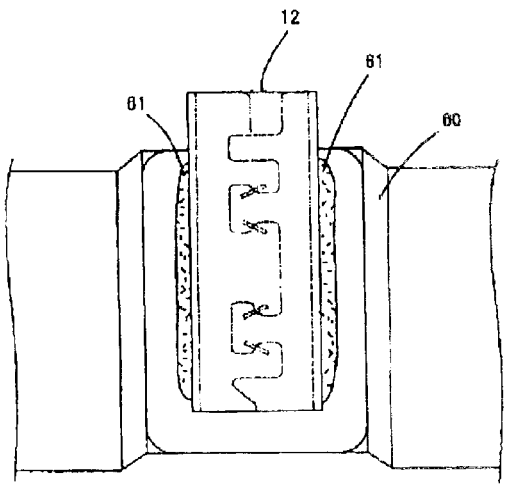
FIG. 30 is a plan view showing a state after panel type welding.
Figure 31:
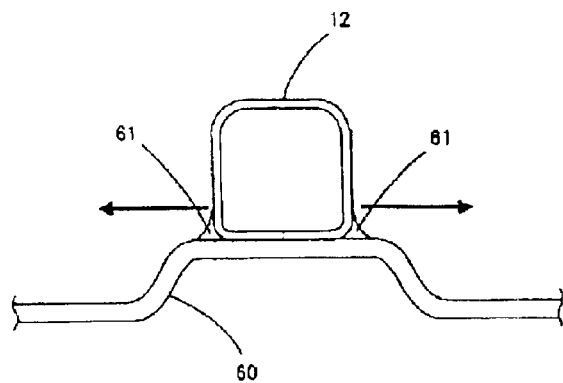
FIG. 31 is a side view showing a state after panel type welding.

As shown in FIG. 30, also when the metallic bracket 12 is welded to a metallic panel 60 along bent portions of the metallic bracket, an external force is applied in disengaging directions of the engage sides of the metallic bracket on cooling of welded portions 61, as shown in FIG. 31. Similar to the example in FIG. 28 described above, the metallic bracket 12 can be prevented from extending.

Accordingly, as noted above, since a high tensile strength is ensured at the joined portion of the metallic bracket 12, deformation of the joined portion is prevented.

Figure 32:
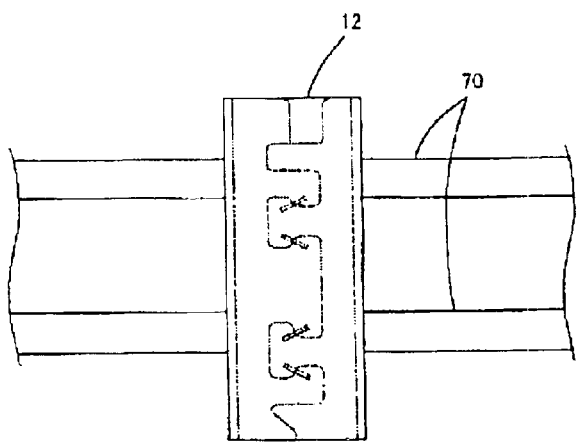
FIG. 32 is a plan view showing a state after wire type welding.
Figure 33:
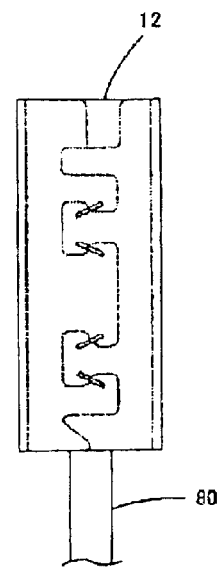
FIG. 33 is a plan view showing a state after another wire type welding.
Figure 34:
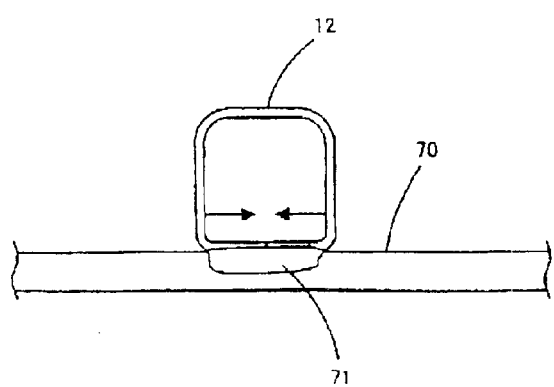
FIG. 34 is a side view showing a state after the wire type welding illustrated in FIG. 32.
Figure 35:
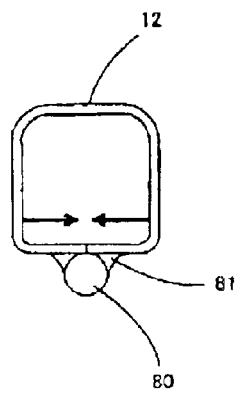
FIG. 35 is a side view showing a state after the wire type welding illustrated in FIG. 33.

As shown in FIGS. 32 and 33, when the metallic bracket 12 is welded along metallic members 70 and 80 of a small diameter, an external force is applied in disengaging directions of the engaged sides of the metallic bracket as welded portions 71 and 81 are cooled, as shown in FIGS. 34 and 35. As against the compressing direction, the indentations formed by crushing as shown in the figures serve to prevent the metallic bracket 12 from compressing.

Accordingly, the joined portion of the metallic bracket 12 is prevented from deformation because a high tensile strength is ensured at the jointed portion.

Figure 36:
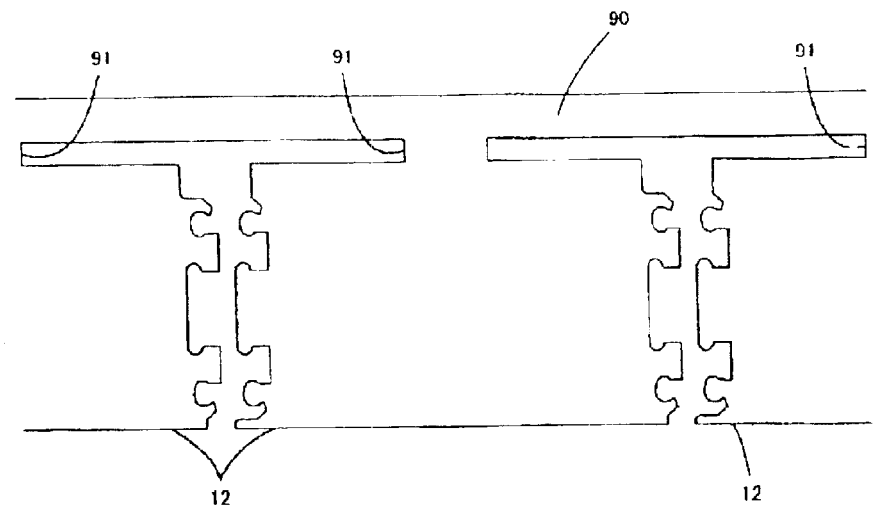
FIG. 36 is a plan view showing a metallic plate after punching.
Figure 37:
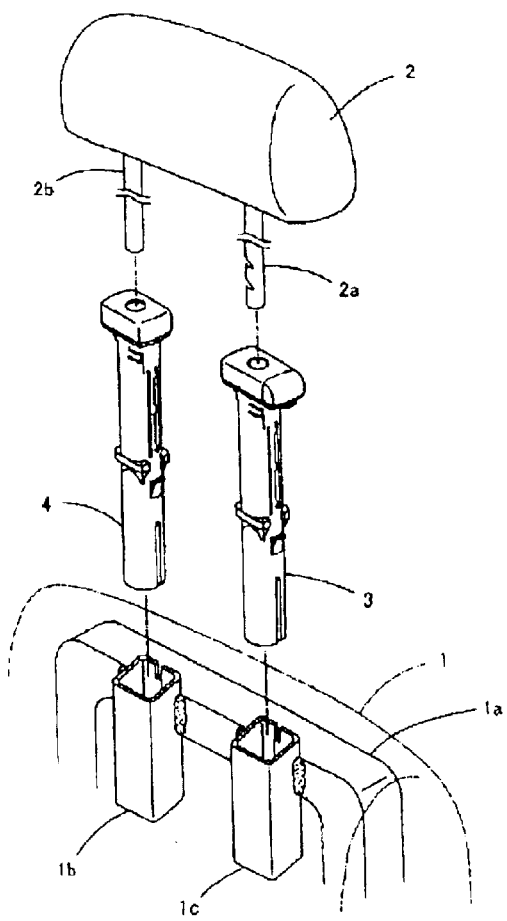
FIG. 37 is a perspective view showing a headrest support structure which utilizes a conventional metallic bracket.
Figure 38:
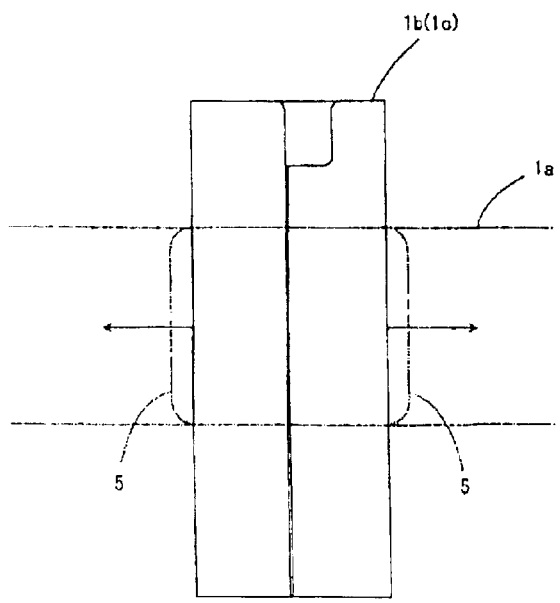
FIG. 38 is an explanatory diagram showing an external force applied to the conventional metallic bracket when welded to a metallic frame.

As shown in FIG. 36, the metallic bracket 12 is fabricated by punching a metallic plate while being supported by each support portion 91 extended from a band member 90. Then, after folding, the sides A and B are mutually press-fitted and joined together, as shown in FIG. 3, followed by cutting at a boundary position (a progressive connection) with respect to each support portion 91.

In this case, since the metallic plate is folded and thereafter cut off from the support portion 91, an upper end face shown in the same figure can be cut off at an approximately uniform level. This is for the following reason. In case of cutting off the metallic plate before folding thereof, a morphological error of the metallic plate after punching must be taken into account and the metallic plate must be cut off at a position slightly offset to the band member 90 side from the boundary position with respect to the support portion 91 so as not to cut off even the upper end face shown in the same figure which end face is not in contact with the support portion 91.

Consequently, it is no longer necessary to grind a cut section of the metallic bracket 12 after joining of the sides A and B, whereby the production efficiency can be improved. In this point the above manufacturing method is useful.

Thus, when forming the metallic bracket 12 by mutually engaging the projections and recesses formed on the left and right sides A, B of the metallic plate, the portions P through S which span adjacent projections are crushed stripewise to form indentations, whereby metal pushed out of the indentations P through S is fed around the projections to enhance the adhesion between adjacent projections and realize a strong joint. Further, by making a design such that the width of a base portion of a projection on the inserted side in the seam direction is twice the width of a base portion of a projection on the inserting side, a sufficient strength is imparted to the joined portion. Consequently, it is possible to prevent a change in inside diameter caused by an external force which is developed on cooling of the welded portions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A metallic cylindrical member fabricated by forming concave and convex portions on a pair of sides of a metallic plate, the concave and convex portions being adapted to engage each other in an anti-dislodgment manner, making both sides confront each other, and bringing both sides into engagement with each other to join both sides, wherein in the engaged state of the concave and convex portions formed on both sides of the metallic plate, both sides are crushed in the thickness direction to form indentations at a portion including the mutually opposed concave and convex portions.

2. A metallic cylindrical member according to claim 1, wherein the concave and convex portions formed on both sides of the metallic plate are formed so as to have approximately equal shortest distances in a seam direction.

3. A metallic cylindrical member according to claim 1, wherein both sides are crushed stripewise to form an indentation at a portion including the concave and convex portions.

4. A metallic cylindrical member according to the claim 3, wherein the indentation is formed by stripewise crushing while escaping obliquely with respect to a boundary between the concave and convex portions.

5. A metallic cylindrical member according to claim 1, wherein a dent is formed by crushing both sides in a circular shape at a portion including the concave and convex portions.

6. A metallic cylindrical member according to claim 1, wherein an indentation is formed by crushing both sides bandwise at a portion including the concave and convex portions so as to provide a larger width on the side spaced apart from the concave/convex boundary.

7. A metallic cylindrical member according to claim 1, wherein a dent is formed by crushing both sides bandwise at a portion including the concave and convex portions in such a manner that narrow and wide portions are formed alternately in directions away from the concave/convex boundary with the boundary portion formed wide.

8. A metallic bracket wherein a plurality of projections adapted to engage each other are formed on a pair of sides of a metallic plate so that shortest distances in a seam direction of the projections on both sides are almost equal to each other, both sides of the metallic plate are opposed to each other and the projections are brought into engagement with each other, while allowing a joined portion to be included in one generally flat wall surface, followed by stripewise crushing at portions including the projections to form indentations, allowing both sides to be joined together, whereby the metallic plate is formed into a generally square pipe as a metallic cylindrical member, a metallic frame is disposed with an axis thereof oriented nearly horizontally at an upper position in the interior of a seat back of a first seat which is mounted on an automobile, bent portions of the metallic cylindrical member abutted against a generally flat wall surface of the metallic frame are welded to the wall surface in a state in which an axis of the metallic cylindrical member is oriented in a substantially vertical direction and in which the joined portion is in substantially close contact with the wall surface of the metallic frame, and a generally cylindrical headrest support which supports a headrest stay projected in a nearly vertically downward direction from the headrest is inserted into the metallic cylindrical member from above nearly vertically.

9. A metallic bracket wherein a plurality of projections adapted to engage each other are formed on a pair of sides of a metallic plate so that shortest distances in a seam direction of the projections on both sides are almost equal to each other, both sides of the metallic plate are opposed to each other and the projections are brought into engagement with each other, while allowing a joined portion to be included in one generally flat wall surface, followed by stripewise crushing at portions including the projections to form indentations, allowing both sides to be joined together, whereby the metallic plate is formed into a generally square pipe as a metallic cylindrical member, a pair of metallic frames are disposed at upper positions in the interior of a seat back of a second or third seat mounted on an automobile, the metallic frames being disposed in nearly parallel with each other at a predetermined interval while allowing their axes to be oriented in a substantially horizontal direction, bent portions of the metallic cylindrical member abutted against generally flat wall surfaces of the metallic frames are welded to side wall surfaces in a state in which the metallic cylindrical member spans the metallic frames while allowing the axis of the metallic cylindrical member to be oriented in a substantially vertical direction and in which the joined portion is in substantially close contact with the wall surfaces of the metallic frames, and a generally cylindrical headrest support which supports a headrest stay projected in a nearly vertically downward direction from the headrest is inserted into the metallic cylindrical member from above nearly vertically.

10. An apparatus for supporting a vehicle headrest comprising:
- a plurality of headrest supports for receiving and supporting headrest stays that are projected substantially vertically downward from the headrest; and
- a plurality of metallic cylindrical members as set forth in claim 1 for receiving and supporting the plurality of headrest supports.

* * * * *